US009208293B1

(12) United States Patent
Zhu

(10) Patent No.: US 9,208,293 B1
(45) Date of Patent: Dec. 8, 2015

(54) AUTHENTICATION FOR TAG-BASED CONTENT DELIVERY

(75) Inventor: Kevin Zhu, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 1801 days.

(21) Appl. No.: 12/020,599

(22) Filed: Jan. 28, 2008

(51) Int. Cl.
*G06F 21/10* (2013.01)
*H04W 12/04* (2009.01)
*H04W 4/00* (2009.01)

(52) U.S. Cl.
CPC .............. *G06F 21/10* (2013.01); *H04W 12/04* (2013.01); *H04W 4/008* (2013.01)

(58) Field of Classification Search
CPC ....... G06F 21/10; H04W 4/008; H04W 12/04
USPC ............................. 713/176; 726/4, 9, 10, 20
See application file for complete search history.

(56) References Cited

U.S. PATENT DOCUMENTS

| | | | |
|---|---|---|---|
| 6,199,048 B1* | 3/2001 | Hudetz et al. ................ 705/23 |
| 6,993,573 B2* | 1/2006 | Hunter ........................ 709/218 |
| 6,996,402 B2* | 2/2006 | Logan et al. ............... 455/456.1 |
| 7,203,967 B2* | 4/2007 | Chmaytelli et al. ............ 726/30 |
| 8,159,329 B1* | 4/2012 | Killian et al. ................ 340/8.1 |
| 8,489,437 B1* | 7/2013 | Dlott et al. .................. 705/7.11 |
| 2003/0065922 A1* | 4/2003 | Fredlund et al. ............. 713/176 |
| 2005/0100166 A1* | 5/2005 | Smetters et al. ............. 380/277 |
| 2005/0245271 A1* | 11/2005 | Vesuna ...................... 455/456.1 |
| 2006/0238370 A1* | 10/2006 | Park et al. ................ 340/825.49 |
| 2009/0044254 A1* | 2/2009 | Tian .............................. 726/4 |
| 2009/0115573 A1* | 5/2009 | Naressi et al. ............... 340/10.1 |
| 2009/0315670 A1* | 12/2009 | Naressi et al. ................ 340/5.8 |

FOREIGN PATENT DOCUMENTS

WO    WO 2008/069403      *  6/2008    ............. G06K 17/00

OTHER PUBLICATIONS

Varshney, Upkar. "Location management for mobile commerce applications in wireless internet environment." ACM Transactions on Internet Technology (TOIT) 3.3 (2003): 236-255.*
Han, Kyusuk, and Kwangjo Kim. "Enhancing privacy and authentication for location based service using trusted authority." 2nd Joint Workshop on Information Security. (2007): 1-13.*
Lee, Kyoung Jun, and Jungho Jun. "Tag Match Advertising Business Model in Mobile RFID Environment." Convergence and Hybrid Information Technology, 2008. ICCIT'08. Third International Conference on. vol. 1. IEEE, (2008): 837-841.*

* cited by examiner

*Primary Examiner* — Kari Schmidt

(57) ABSTRACT

A method of authenticating a content reference that is related to a public information display to reduce third party interference with the content reference is provided. The method comprises reading information from a tag, the information including a content reference, wirelessly transmitting the information, and comparing the information with authentication information associated with the content reference. The content reference identifies a content. The method also comprises sending an authentication result, wherein the authentication result is based on the comparing, and requesting the content when the authentication result is positive.

12 Claims, 6 Drawing Sheets

AUTHENTICATION FOR TAG-BASED CONTENT DELIVERY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A radio frequency identification (RFID) tag is an object that can be attached to or incorporated into a product, animal, or person for the purpose of identification using radio waves. RFID tags may be very small. In one embodiment, an RFID tag is 0.4 mm squared, contains a 128-bit read only memory (ROM) capacity, has a read range of up to 30 cm, and employs no battery. Continuing advances in technology can be expected both to reduce RFID tag size further and to increase RFID tag memory capacity. RFID tags can be printed on objects, inserted into objects, woven into objects, adhered to objects, and incorporated into or attached to objects in other ways. RFID tags typically contain at least two parts. The first part is an integrated circuit for storing and processing information, modulating and demodulating a radio frequency (RF) signal and perhaps other specialized functions. The second part is an antenna for receiving and transmitting the RF signal.

Two-dimensional bar codes are designed to be reliably read from various reading angles and orientations by a low-quality scanner or a camera. Two-dimensional bar codes may include SEMACODE, SHOTCODE, and other two-dimensional bar codes.

SUMMARY

A method of authenticating a content reference that is related to a public information display to reduce third party interference with the content reference is disclosed. The method comprises reading information from a tag, the information including a content reference, wirelessly transmitting the information, and comparing the information with authentication information associated with the content reference. The content reference identifies a content. The method also comprises sending an authentication result, wherein the authentication result is based on the comparing, and requesting the content when the authentication result is positive.

A method of retrieving content is also disclosed. The method comprises reading a digital certificate, a content address, and a location. The method also comprises sending the digital certificate and the location to an authentication server, comparing the location to an expected location, wherein the expected location is determined based on the digital certificate, and sending a positive authentication when the location matches the expected location. The method also comprises receiving the positive authentication and requesting content based on receiving the positive authentication and based on the content address.

A system for content authentication is disclosed. The system comprises a tag, an authentication server, and a portable electronic device. The tag encodes content access information. The authentication server is configured to authenticate the content access information based on a location and to transmit an authentication result. The portable electronic device communicates with the authentication server and is configured to read the content access information from the tag, to wirelessly transmit the content access information and the location, wherein the location is a location of the portable electronic device, and to receive the authentication result from the authentication server.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
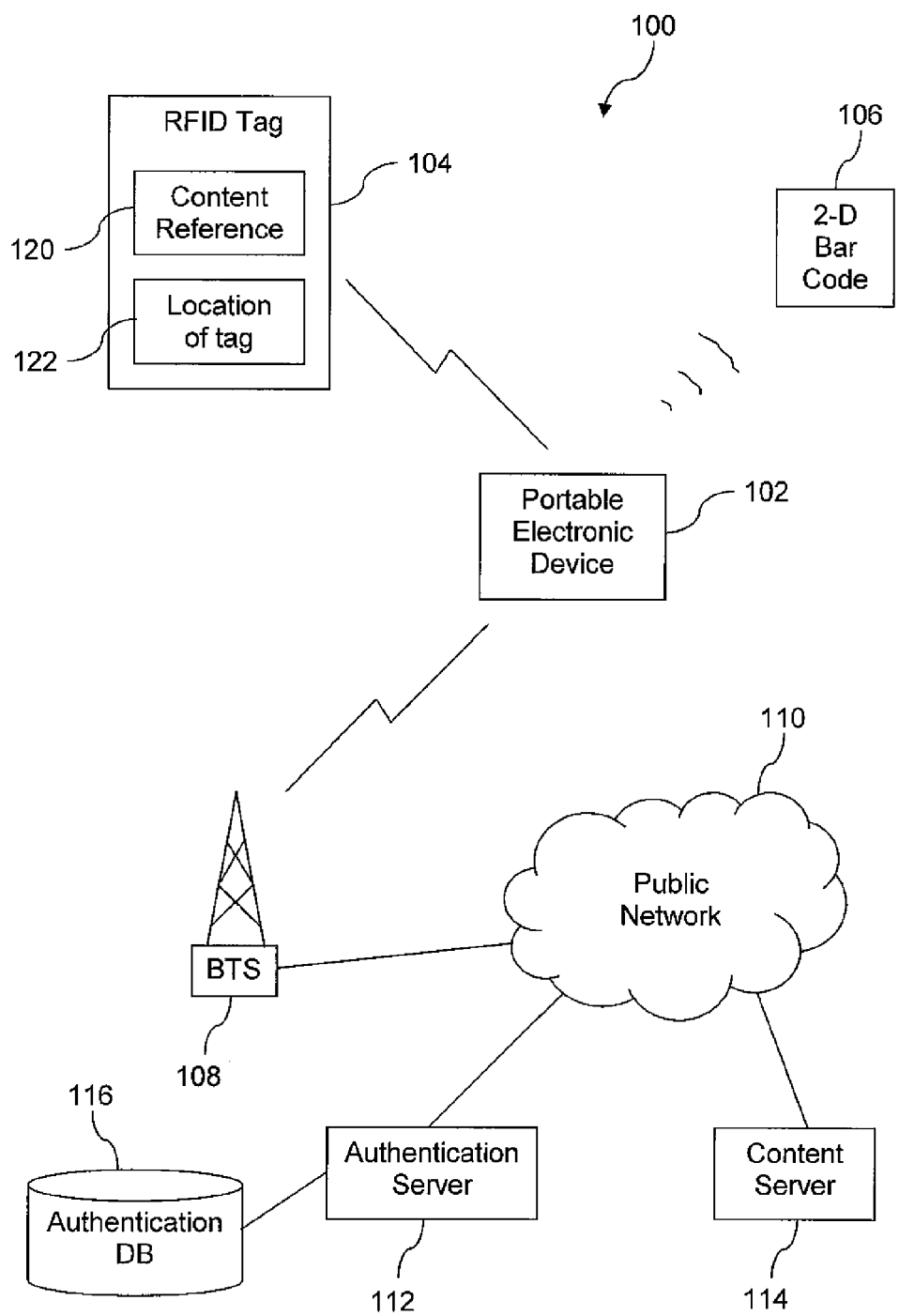
FIG. 1 illustrates an authentication system for tag-based content delivery according to one or more embodiments of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Tags containing a content reference may be read by a portable electronic device containing an appropriate reader, for example, a mobile phone or personal digital assistant. The device may use the content reference to access the content, for example, reading a universal reference locator (URL) from an RFID tag attached to a poster, a restaurant menu item, a display book at a book store, a product placard on a store shelf, a displayed article or display placard at an art museum or other museum, or other public information display, accessing the referenced content with a browser, and displaying a web page associated with the poster. Because tags may be very small, an advertisement or other notice having a tag may be pirated by replacing the legitimate tag with a spurious tag, wherein the spurious tag may reference content of a business competitor, inappropriate content, or some other unassociated content. The tags may also be vandalized or otherwise tampered with in various ways. These may generally be referred to as third party interference with the content reference. A system and method for detecting a spurious tag and preventing accessing unintended content is disclosed. When the device reads the tag, the device sends the reference and possibly other information to an authentication server for authentication. The authentication server may perform authentication by matching the reference and other information received from the device with trusted information in an authentication database. For example, a reference and physical location sent by the device may be compared to data in a row of an authentication database accessed using the reference as the database access key. If no row is found with the key or if the physical location associated with the key in the authentication database does not match the physical location sent by the device, authentication is deemed failed. In other embodiments, other authentication methods and procedures may be employed. The trusted information in the authentication database may be provisioned by a database administrator or by content providers who are legitimate owners of the tags. The authentication server returns an authentication result to the device. If the authentication result is positive, the device then accesses the referenced content, for example, from a content server. If the authentication result is negative, the device does not attempt to access the referenced content. In an embodiment, the device provides an output indicating that authentication of the tag has failed and that the content cannot be displayed. In an embodiment, the authentication server may determine a legitimate owner of the pirated or vandalized tag and send a notification of the pirating or vandalizing of the tag to the legitimate tag owner.

Turning now to FIG. 1, a system 100 for authenticating tag-based content delivery is discussed. The system 100 comprises a portable electronic device 102, a tag, a base transceiver station (BTS) 108, a public network 110, an authentication server 112, and a content server 114. In an embodiment, the authentication server 112 is in communication with an authentication database 116. In an embodiment, the tag may be an RFID tag 104, a two dimensional (2-D) bar code tag 106, or both.

The RFID tag 104 may be adhered to, inserted inside of, stitched into, printed onto, weaved into, or otherwise associated with an object (not shown). The object may include, but is not limited to, a poster, an advertisement placard, a product display, a schedule, a mass transportation schedule, a business frontage, a grocery store product, a displayed article and/or display placard at a museum, or other notice or notification. Multiple RFID tags 104 may be associated with a restaurant menu, for example, each of a plurality of menu items, and may provide a link to a description of the nutritional content of the menu items. An RFID tag 104 may be associated with a placard associated with a displayed article in a museum and may provide a link to a detailed description of the displayed article. An RFID tag 104 may be associated with a display book on a shelf in a book store and may provide a link to a review of the book or other descriptive information associated with the book. A business frontage may be a front door, a front window, or other portal associated with a business which may provide a platform or portal for distributing information about the business. An RFID tag 104 may be associated with a business frontage, for example, with the business name printed on the door, an address printed on the door, or other focus area and may provide a link to a web site providing further information about the business including hours of operation, history of the business, services and/or products provided by the business, and other information. The object may be a pushbutton and/or a selection button, for example, a pushbutton associated with a vending machine or a selection button associated with a control panel and/or interface. An RFID tag 104 may be associated with the pushbutton and provide a link to further information about the product or function selected. The object that the RFID tag 104 may be associated with may be generally referred to as a public information display. The RFID tag 104 provides access to information about the object with which it is associated. In an embodiment, the RFID tag 104 provides a content reference 120 and a location 122 of the RFID tag 104 to the device 102 when the device 102 reads, scans, or otherwise interacts with the RFID tag 104. The location 122 identifies a physical location of the RFID tag 104, for example, a set of global positioning system coordinates, a set of latitude-longitude coordinates, a street address, or other physical location information. In an embodiment, the information does not include the location 122. The content reference 120 provides a reference to a content, for example, a universal reference locator (URL) that references a web page stored by the content server 114. The content may include, but is not limited to, audio content, video content, text content, graphical content, multimedia content, and a combination thereof. The content reference 120 may include in part an internet protocol (IP) address of a computer where the content may be accessed. The content reference 120 may provide other information that promotes establishing a connection to a computer containing content associated with the object and accessing the content.

The 2-D bar code 106 may be adhered to or printed onto an object (not shown), as described above, and may encode information for accessing content associated with the object. In an embodiment, the device 102 reads, scans, or otherwise reads the 2-D bar code 106 to obtain the encoded information. The device 102 is configured to decode the information and to use the decoded information to access the content associated with the object. In an embodiment, the information encoded by the 2-D bar code 106 may include a physical location of the 2-D bar code 106, for example, a set of global positioning system coordinates, a set of latitude-longitude coordinates, a street address, or other physical location information.

The device 102 may be a mobile phone, a personal digital assistant (PDA), a palm top computer, or other portable electronic device. The device 102 is configured with a reader that may read the RFID tag 104 and/or the 2-D bar code 106 associated with the object and to use the information read to access additional content associated with the object. In an embodiment, the device 102 includes a camera and reads the 2-D bar code 106 by taking a picture of the 2-D bar code with the camera and analyzing the picture to decode the 2-D bar code. For example, the device 102 may use the information to browse to a web page referenced by the content reference 120 to playback a multimedia message about a concert advertised in a poster on which the RFID tag 104 and/or 2-D bar code 106 is affixed. In an embodiment, the device 102 may take the form of a handset. Handsets are discussed in more detail hereinafter. The device 102 may access the public network 110 through wirelessly communicating with the base transceiver station 108 and through the public network 110 may access the authentication server 112 and the content server 114.

The base transceiver station 108 provides wireless access to the public network 110 to wireless devices within a coverage area of the base transceiver station 108, for example, to the device 102. The wireless communication between the device 102 and the base transceiver station 108 may be provided according to any of a number of different wireless protocols including, but not limited to, global system for mobile communications (GSM), universal mobile telecommunications system (UMTS), code division multiple access (CDMA), high speed packet data (HSDP), worldwide interoperability for microwave access (WiMAX), and others. The wireless communication links may be based on time division multiple access (TDMA), frequency division multiple access (FDMA), frequency hopping spread spectrum, direct sequence spread spectrum, orthogonal frequency division multiple access (OFDMA) techniques, or other wireless communication techniques. In an embodiment, the base transceiver station 108 may connect to the public network 110 via a base station controller (BSC) (not shown) and through a mobile switching center (MSC) (not shown), as is known to one skilled in the art. In another embodiment, the base transceiver station 108 may connect to the public network 110 in a different way.

The public network 110 may be composed of multiple networks, for example, a wireless network, a public data network, a public switched telephone network, and other networks. The public network 110 may be composed of a plurality of communication nodes interconnected by communication links. The nodes may include, but are not limited to, switches, cross-connects, routers, repeaters, microwave relay stations, mobile switching centers, and other communications nodes well known to those skilled in the communications art.

The authentication server 112 may be any general purpose computer system. General purpose computer systems are discussed in more detail hereinafter. The authentication server 112 is connected to the public network 110 and through the public network to the content server 114 and to the base transceiver station 108. The authentication server 112 is connected to the portable electronic device 104 via the public network 110 and the base transceiver station 108. The authentication server 112 receives an authentication request from the device 102 containing information the device 102 has read or scanned from the RFID tag 104 and/or 2-D bar code 106. The authentication server 112 attempts to authenticate the information and returns an appropriate authentication response to the device 102.

In an embodiment, the authentication server 112 may authenticate the information by matching a location of the RFID tag 104 and/or 2-D bar code 106 and the reference contained in the information to an associated location and reference stored in the authentication database 116. The associated location and reference may be referred to as a location and reference tuple or a location and reference pair. The location and reference pair are associated in the authentication database 116 in some way, for example, by being stored in the same row or by some other method of association. The authentication server 112 may, for example, use the reference as a key to search for entries in the authentication database 116. If the authentication server 112 finds no entries with the key or if the entry that is found using the key contains a location that does not match the location provided by the device 102 in the information, the authentication fails; otherwise the authentication succeeds. The authentication database 116 may be provisioned with a plurality of these location and reference pairs and/or location and reference tuples by an administrator or by one or more content providers, for example, a content provider subscribing to an authentication service promoted by an enterprise that operates the authentication server 112 and the authentication database 116. The location and reference pairs in the authentication database 116 may be referred to as trusted information. In an embodiment, the device 102 may know its own location, for example, through a global positioning system (GPS) receiver contained by the device 102, and provide the location of the device 102 to the authentication server 112 along with the tag information. In an embodiment, the authentication server 112 may use the location of the device 102 and the reference information to complete authentication. In another embodiment, the authentication server 112 may compare the location provided by the RFID tag 104 and/or 2-D bar code 106 with the location of the device 102 during the process of completing authentication.

In an embodiment, a digital signature associated with the content provider or the legitimate owner of the RFID tag 104 is stored with the RFID tag 104. When the device 102 reads the RFID tag 104, it reads the reference and the digital signature. When the device 102 sends the reference to the authentication server 112 it also sends the digital signature. If the authentication server 112 is able to confirm the digital signature to be associated with the legitimate owner of the RFID tag 104 or the content provider, for example, by referencing the authentication database 116, the authentication succeeds. Alternatively, an encrypted hash of the reference may be stored by the RFID tag 104. In an embodiment, the content server 114 may employ a hashing function also known to the authentication server 112 to generate a hash value based on the reference contained in the RFID tag 104. The content server 114 may then encrypt the hash value using a private key also known to the authentication server 112. This content server 114 may store this encrypted hash value in the RFID tag 104. When the device 102 reads the RFID tag 104, it reads the reference and the encrypted hash value. When the device 102 sends the reference to the authentication server 112 it also sends the encrypted hash value. The authentication server 112 uses the known hashing function to determine the hash value from the reference sent by the device 102. The authentication server 112 decrypts the encrypted hash value sent by the device 102 and compares the two hash values. If the comparison succeeds, the authentication succeeds. Other authentication procedures based on digital signatures and encrypted hash values readily suggest themselves to one skilled in the art, and these related approaches are also contemplated by the present disclosure. For example, the encrypted hash value may be determined and stored in the RFID tag 104 by some other entity than the content server 114.

If the authentication fails, that is if the authentication server is not able to confirm the association of the location, the digital signature, or the encrypted hash value with the reference provided by the authentication request, a negative authentication response is sent to the device 102. In an embodiment, the device 102 is configured to not access the referenced content when a negative authentication response is received. In another embodiment, the device 102 may provide a warning that the reference to content could not be authenticated and allow a user to choose whether to continue to access the content using the dubious reference scanned or read from the RFID tag 104 and/or 2-D bar code 106. This optional behavior may be desirable in case the failed authentication was not caused by pirating or replacement of the RFID tag 104 and/or 2-D bar code 106 but results because the content provider does not subscribe to the authentication service and validation data for the RFID tag 104 and/or 2-D bar code 106 may not be stored in the authentication database 116. If the authentication succeeds, the device 102 may use the reference to access the content, for example, using a browser to obtain web page content using a URL and receiving the content using a hyper text transfer protocol (HTTP). In other embodiments, the device 102 may access content by other communication methods.

In an embodiment, if the authentication fails, the authentication server 112 attempts to determine a content provider who is legitimately associated with the object to which the RFID tag 104 and/or 2-D bar code 106 is attached, for example, by associating the location of the device 102 with a location stored in the authentication database 116. If the authentication server 112 is able to determine the content provider that is legitimately associated with the object, the authentication server 112 also sends a notification about the failed authentication to the content provider. The content provider that is legitimately associated with the object to which the RFID tag 104 and/or 2-D bar code 106 is attached, such as an advertiser who has paid for the use of space on a public kiosk or other location, may wish to take steps to correct the pirating or hijacking of the object by a spurious or illegitimate RFID tag 104 and/or 2-D bar code 106.

Figure 2:
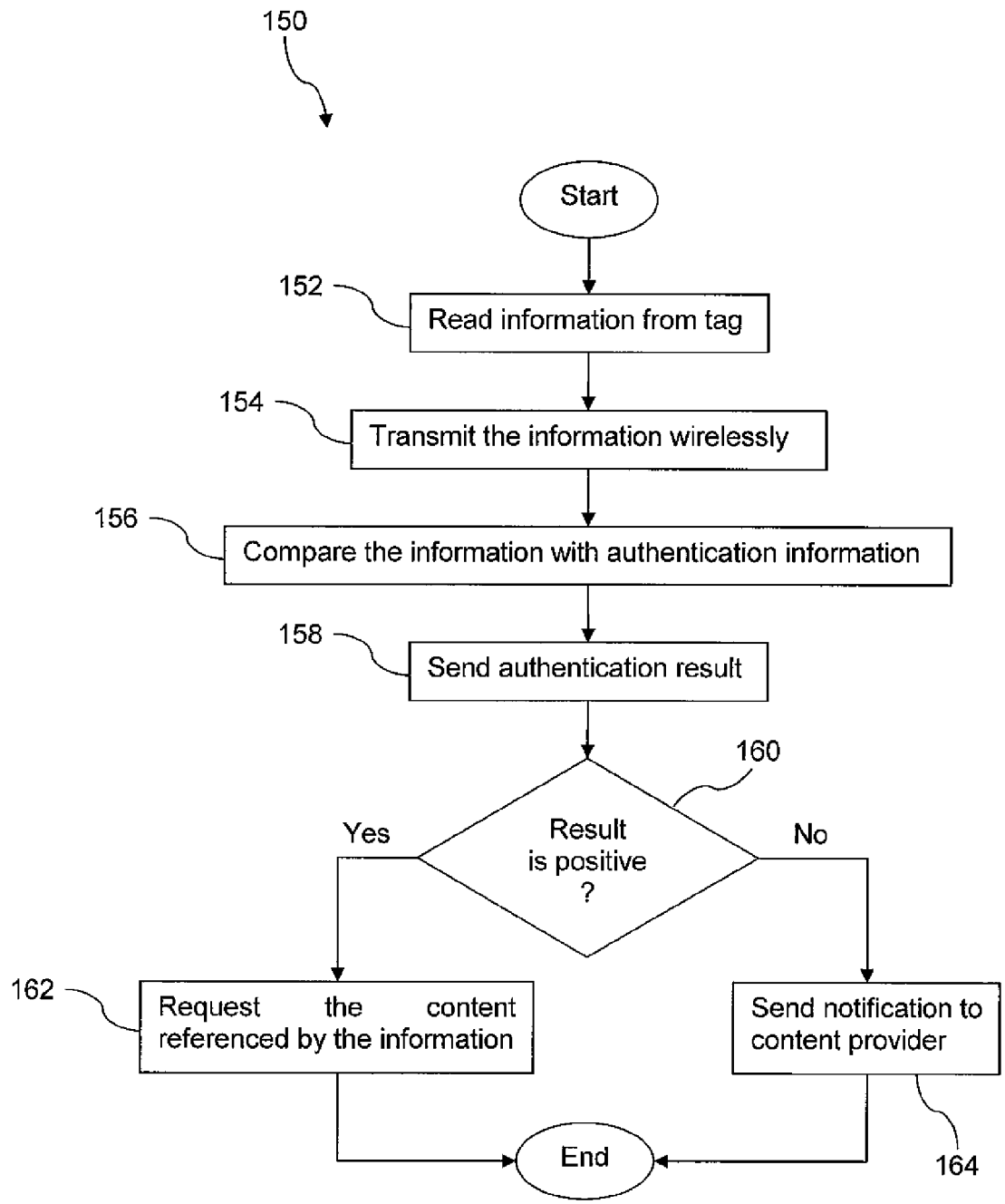
FIG. 2 illustrates a method of authentication for tag-based content delivery according to an embodiment of the disclosure.

Turning now to FIG. 2, a method 150 of authentication for tag-based content delivery is discussed. At block 152, information is read from a tag, for example an RFID tag, a 2-D bar code tag, or other tag. In an embodiment, the tag may be the RFID tag 104 or the 2-D bar code tag 106. The tag is associated with an object, for example a poster, an advertisement placard, a product display, a schedule, a business frontage, or other notice or notification. The information includes a reference to content that is associated with the object. As an example, the tag may be associated with the front door of a business and may provide a URL to the web page of the business. When passersby see the business during intervals of closure, such as after hours or on weekends, they may scan the tag and conveniently access the web page of the business for additional information about the business. The content may include, but is not limited to, audio content, video content, text content, graphical content, multimedia content, and a combination thereof. The information may also include a location of the object.

At block 154, the information is transmitted wirelessly. In an embodiment, the information is transmitted wirelessly by the device 102 to the base transceiver station 108, from the base transceiver station 108 to the public network 110, and from the public network 110 to the authentication server 112, for example, in the form of an authentication request. In an embodiment, the device 102 sends the location of the device 102 with the information to the authentication server 112 for use in authentication. In an embodiment, the information may be read at block 152 and transmitted wirelessly at block 154 at a later time, for example, at a time when the device 102 returns into wireless communication with the base transceiver station 108 after a period of being beyond range of a radio access network (RAN).

At block 156, the information is compared with authentication information. In an embodiment, the authentication server 112 accesses authentication information from the authentication database 116 to compare against the information. The authentication information may be provisioned into the authentication database 116 by an administrator or by a content provider. At block 158, the authentication result is sent to the device 102.

At block 160, if the authentication result is positive, meaning the information matches the authentication information, the method 150 proceeds to block 162. At block 162, the referenced content is requested. In an embodiment, the device 102 sends a content request using a URL or other reference to the content server 114. The content is returned to the device 102, and the device plays or displays the content. At block 160, if the authentication result is negative, the method 150 proceeds to block 164. At block 164, the device 102 does not request the content based on the unauthenticated information and an optional notification message is sent to the content provider who is determined to be legitimately associated with the object which the tag is associated with.

Figure 3:
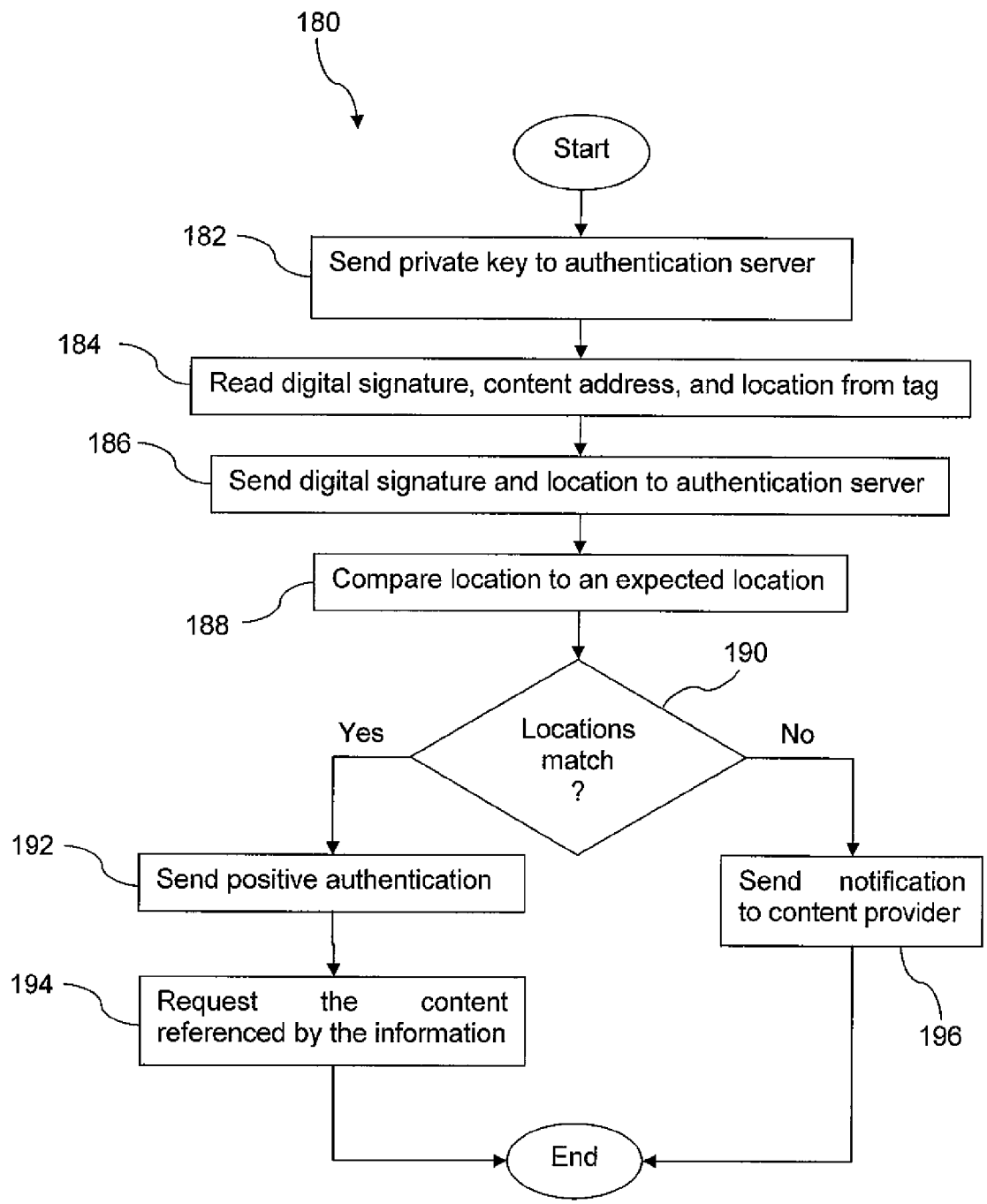
FIG. 3 illustrates another method of authentication for tag-based content delivery according to an embodiment of the disclosure.

Turning now to FIG. 3, a method 180 of authentication for tag-based content delivery is discussed. At block 182 a private key associated with the legitimate owner of the RFID tag 104 is sent from a content provider or from another source to the authentication server 112. The private key may be used to decrypt a digital signature, and the decrypted digital signature may be associated with a reference to content and, optionally, to a location of an object, for example, in the authentication database 116. The association between the decrypted digital signature, the reference to content, and to the location of the object may be provisioned into the authentication database 116 through manual entry by an administrator or by automated means.

At block 184, a digital signature, a reference to content, and a location is read or scanned from a tag. In an embodiment, the tag is the RFID tag 104. The reference to content may be a content address, a URL, or other reference to content. In an embodiment, the device 102 reads or scans the tag.

At block 186, the digital signature and location are sent to the authentication server 112. In an embodiment, the device 102 sends the digital signature and the location to the authentication server 112. In an embodiment, the device 102 is able to determine its own location and sends the location of the device 102 to the authentication server 112. In an embodiment, the reference to content is also sent to the authentication server 112.

At block 188, the location is compared to an expected location, where the expected location is determined based on the digital signature. In an embodiment, the authentication server 112 decrypts the digital signature using the private key obtained in block 182 and searches the authentication database 116 for the decrypted digital signature that matches the location received from the device 102. If there is no match, the authentication fails.

At block 190, if the authentication succeeds, the method 180 proceeds to block 192. At block 192, a positive authentication response is sent. In an embodiment, the authentication server 112 sends the positive authentication response to the device 102. At block 194, the referenced content is requested. In an embodiment, the device 102 requests the content based on the content reference read from the tag.

At block 190, if the authentication fails, the method 180 proceeds to block 196. At block 196 the content is not accessed. Optionally, a notice is sent to the content provider legitimately associated with the object with which the spurious tag is associated, notifying of the pirating of the object by the spurious tag.

Figure 4:
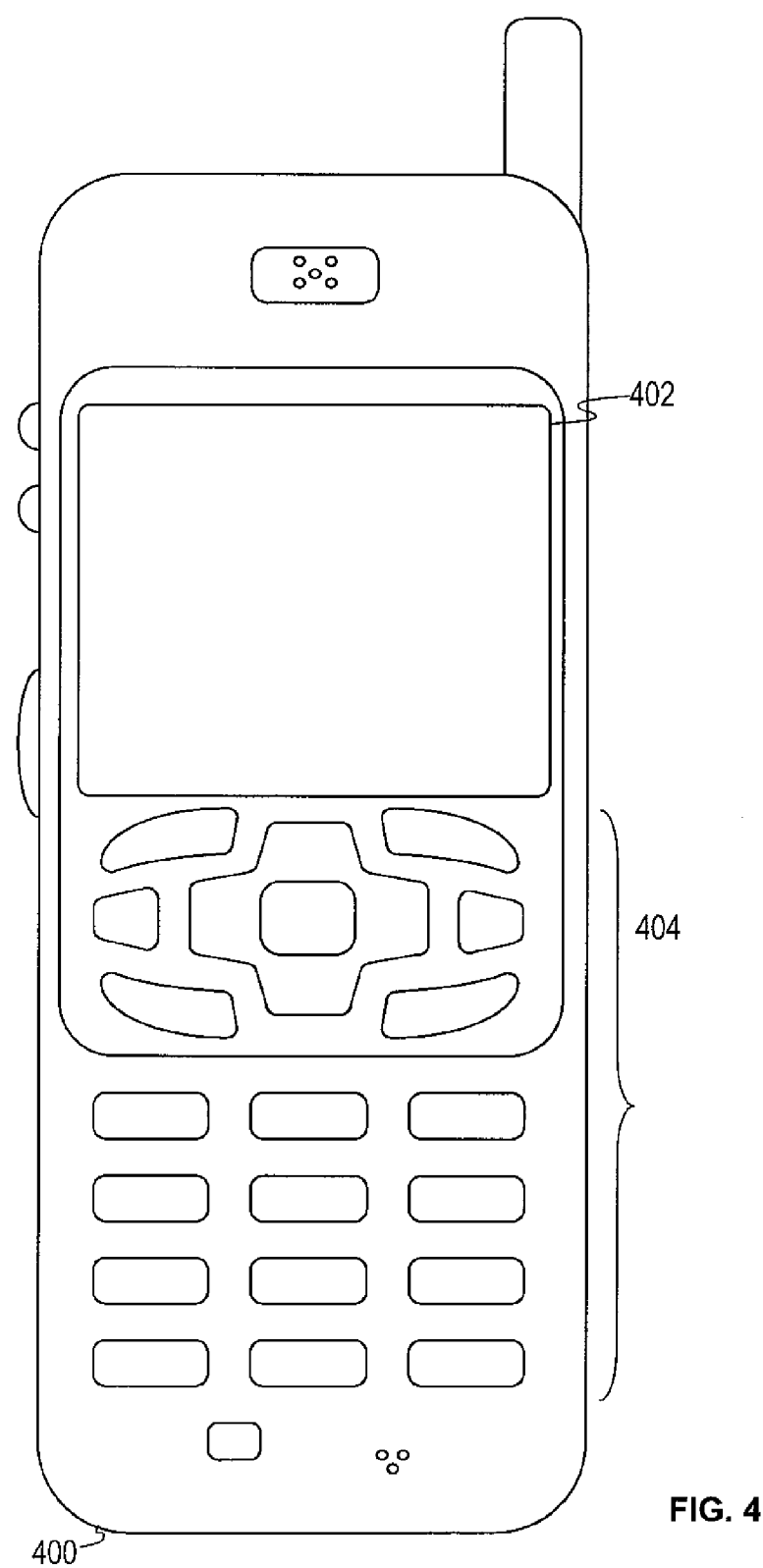
FIG. 4 illustrates an exemplary portable electronic device according to one or more embodiments of the disclosure.

Turning now to FIG. 4, an illustration of a handset 400 that is suitable to implementing some aspects of the present disclosure is discussed. In an embodiment, the handset 400 may implement the portable electronic device 102. Though illustrated as a mobile phone, the handset 400 may take various forms including a wireless handset, a pager, a personal digital assistant (PDA), a portable computer, a tablet computer, or a laptop computer. Many suitable handsets combine some or all of these functions. In some embodiments of the present disclosure, the handset 400 is not a general purpose computing device like a portable, laptop or tablet computer, but rather is a special-purpose communications device such as a mobile phone, wireless handset, pager, or PDA. The handset 400 may support specialized activities such as gaming, inventory control, job control, and/or task management functions, and so on.

The handset 400 includes a display 402 and a touch-sensitive surface or keys 404 for input by a user. The handset 400 may present options for the user to select, controls for the user to actuate, and/or cursors or other indicators for the user to direct. The handset 400 may further accept data entry from the user, including numbers to dial or various parameter values for configuring the operation of the handset. The handset 400 may further execute one or more software or firmware applications in response to user commands. These applications may configure the handset 400 to perform various customized functions in response to user interaction. Additionally, the handset 400 may be programmed and/or configured over-the-air, for example, from the base transceiver station 108, a wireless access point (not shown), or a peer handset 400.

The handset 400 may execute a web browser application which enables the display 402 to show a web page. The web page may be obtained via wireless communications with the base transceiver station 108, a wireless network access node, a peer handset 400 or any other wireless communication network or system. Alternately, the handset 400 may access the base transceiver station 108 through a peer handset 400 acting as an intermediary, in a relay type or hop type of connection.

Figure 5:
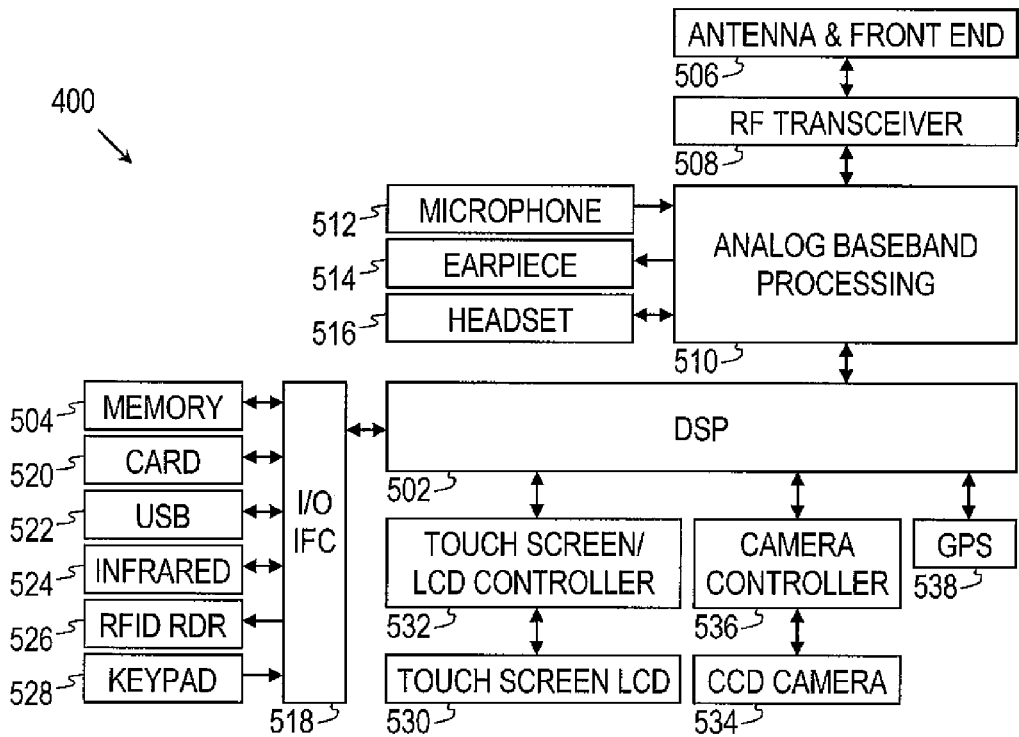
FIG. 5 is a block diagram of an exemplary portable electronic device according to one or more embodiments of the disclosure.

Turning now to FIG. 5, a block diagram of the handset 400 is discussed. While a variety of known components of handsets 102 are depicted, in an embodiment a subset of the listed components and/or additional components not listed may be included in the handset 400. The handset 400 includes a digital signal processor (DSP) 502 and a memory 504. As shown, the handset 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a RFID reader 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 400 to send and receive information from a cellular network or some other available wireless communications network or from a peer handset 400. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the handset 400 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example, by the DSP 502 or by other central processing units.

The DSP 502 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example, in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example, in an orthogonal frequency division multiplex access (OFDMA) technology application, for the transmitter function the DSP 502 may perform modulation, coding, interleaving, inverse fast fourier transforming, and cyclic prefix appending, and for a receiver function the DSP 502 may perform cyclic prefix removal, fast fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the handset 400 to function as a peripheral device to exchange information with a personal computer or other computer system. The infrared port 524 and other optional ports such as a Bluetooth interface or an IEEE 802.11 compliant wireless interface may enable the handset 400 to communicate wirelessly with other nearby handsets and/or wireless base stations.

The input/output interface 518 may further connect the DSP 502 to the RFID reader 526 that, when triggered, causes the handset 400 to vibrate. The RFID reader 526 is configured to read information from RFID tags, for example the RFID tag 104. In an embodiment, the RFID reader 526 is configured to provide power to a passive RFID tag through one of an RF power signal or an electromagnetic field.

The keypad 528 couples to the DSP 502 via the interface 518 to provide one mechanism for the user to make selections, enter information, and otherwise provide input to the handset 400. Another input mechanism may be the touch screen LCD 530, which may also display text and/or graphics to the user. The touch screen LCD controller 532 couples the DSP 502 to the touch screen LCD 530.

The CCD camera 534 enables the handset 400 to take digital pictures. The DSP 502 communicates with the CCD camera 534 via the camera controller 536. The GPS sensor 538 is coupled to the DSP 502 to decode global positioning system signals, thereby enabling the handset 400 to determine its position. In another embodiment, a camera operating according to a technology other than Charge Coupled Device cameras may be employed. Various other peripherals may also be included to provide additional functions, e.g., radio and television reception.

Figure 6:
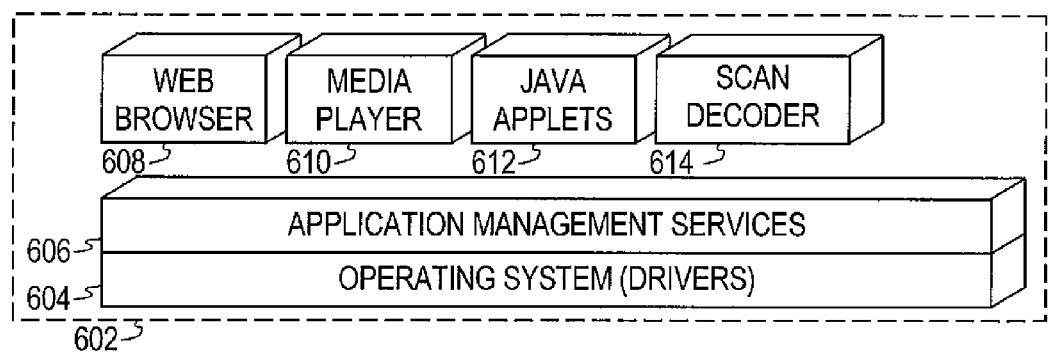
FIG. 6 is a block diagram of an exemplary software architecture for a portable electronic device according to one or more embodiments of the disclosure.

Turning now to FIG. 6, an illustration of a software environment 602 that may be implemented by the DSP 502 is discussed. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 400. Also shown in FIG. 6 are a web browser application 608, a media player application 610, and JAVA applets 612. The web browser application 608 configures the handset 400 to operate as a web browser, allowing a user to enter information into forms and select links to retrieve and view web pages. The media player application 610 configures the handset 400 to retrieve and play audio or audiovisual media. The JAVA applets 612 configure the handset 400 to provide games, utilities, and other functionality. The scan decoder 614 is an optional application that, when installed, is configured to decode 2-D bar codes scanned by the camera 534 or by another scanning peripheral.

Figure 7:
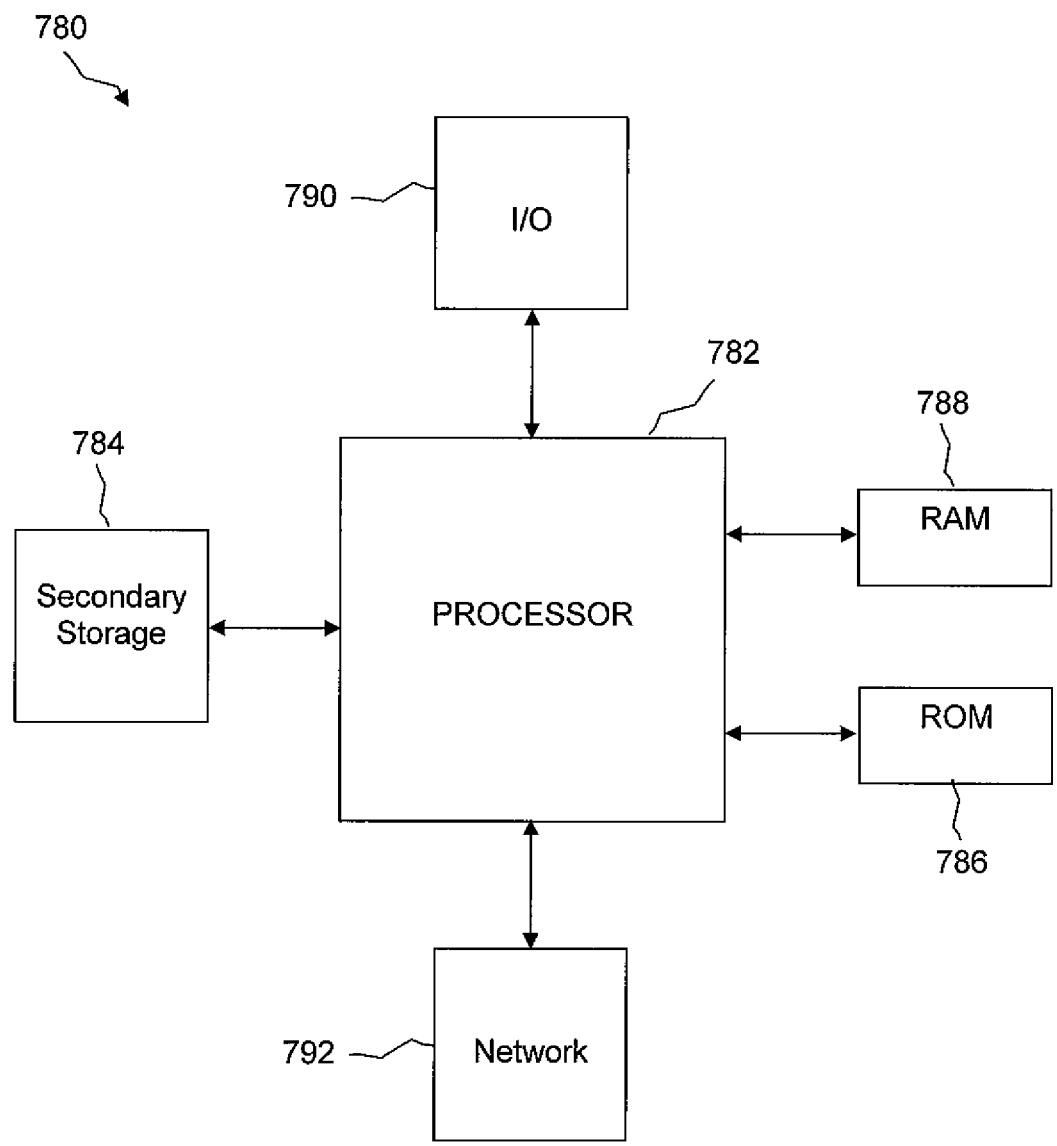
FIG. 7 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example, optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of retrieving content associated with a public information display, comprising:
   receiving, by an authentication server, a private key;
   receiving a digital signature associated with a tag, a content address associated with the tag, a location of the tag, and a location of a portable electronic device from the portable electronic device, wherein the digital signature, the content address, and the location of the tag are read from the tag by the portable electronic device;
   decrypting, by the authentication server, the digital signature associated with the tag using the private key;
   authenticating, by the authentication server, the content address by comparing the content address associated with the tag and the location of the tag to an expected content address associated with the tag and an expected location of the tag and by comparing the location of tag with the location of the portable electronic device, wherein the expected content address associated with the tag and the expected location of the tag are determined based on the decrypted digital signature; and
   sending, by the authentication server, a positive authentication when the content address associated with the tag and the location of the tag matches the expected content address associated with the tag and the expected location of the tag, wherein the positive authentication enables access to content referenced by the content address associated with the tag.

2. The method of claim 1 wherein the digital signature, the content address, and the location of the tag are read by the portable electronic device using contactless communication from the tag associated with the public information display and where the tag is one of a radio frequency identification tag and a two dimensional bar code tag.

3. The method of claim 2 wherein the tag is associated with one of an advertisement, a product display, a business frontage, a directory entry, a retail store product, and a poster.

4. The method of claim 1 wherein the digital signature, the content address, and the location are read from a radio frequency identification tag that is printed on, woven into, glued onto, or inserted into a poster.

5. The method of claim 1 further including receiving the private key by the authentication server.

6. A system for authentication of content associated with a public information display, comprising:
   a tag, wherein the tag encodes a content reference and a location of the tag, and wherein the content reference identifies a content;
   a portable electronic device configured to:
      read the content reference and the location of the tag from the tag,
      wirelessly transmit the content reference, the location of the tag, and a location of the portable electronic device, and
      receive an authentication result; and
   an authentication server configured to:
      authenticate the content reference by comparing the content reference to a list of trusted content references and the location of the tag to the location of the portable electronic device,
      transmit a positive authentication result in response to the content reference matching a trusted content reference in the list of trusted content references and the location of the tag matching the location of the portable electronic device, and
      transmit a negative authentication result in response to at least one of the content reference failing to match any trusted content references in the list of trusted content references or the location of the tag failing to match the location of the portable electronic device.

7. The system of claim 6 wherein the tag is one of a radio frequency identification tag and a two dimensional bar code tag.

8. The system of claim 6 wherein the tag is attached to one of a poster, a product display, an advertisement, a frontage of a business, a selection button, a door, a public transportation schedule, and a product.

9. The system of claim 6 wherein the portable electronic device is one of a mobile phone, a personal digital assistant, a media player, and a palmtop computer.

10. The system of claim 6 further including a content server, wherein the content server is configured to serve the content to the portable electronic device in response to the portable electronic device requesting the content by providing the content reference and the location of the tag.

11. The system of claim 6 wherein the content reference is a universal reference locator.

12. The system of claim 6 wherein the portable electronic device reads the tag using contactless communication.

* * * * *